United States Patent [19]

Okamoto et al.

[11] Patent Number: 4,903,140

[45] Date of Patent: Feb. 20, 1990

[54] APPARATUS FOR REPRODUCING SIGNALS FROM BOTH SIDES OF DISCS

[75] Inventors: Kazuyuki Okamoto, Kyoto; Nasashi Yagi, Neyagawa, both of Japan

[73] Assignee: Sanyo Electric Co., Ltd., Osaka, Japan

[21] Appl. No.: 197,879

[22] Filed: May 24, 1988

[30] Foreign Application Priority Data

| | | |
|---|---|---|
| May 28, 1987 [JP] | Japan | 62-132313 |
| May 29, 1987 [JP] | Japan | 62-136136 |
| May 29, 1987 [JP] | Japan | 62-136137 |
| Jun. 1, 1987 [JP] | Japan | 62-137953 |
| Jun. 8, 1987 [JP] | Japan | 62-142647 |
| Oct. 20, 1987 [JP] | Japan | 62-264364 |
| Nov. 6, 1987 [JP] | Japan | 62-281424 |

[51] Int. Cl.⁴ .................... G11B 7/00; G11B 21/00; G11B 17/00
[52] U.S. Cl. ......................... 358/342; 369/32; 369/195; 369/199
[58] Field of Search ............ 358/342; 369/32, 33, 369/176, 199, 195; 360/69, 75, 97.01, 98.04, 101, 104

[56] References Cited

U.S. PATENT DOCUMENTS 4,416,003 11/1983 Suzuki .................. 369/199 X
4,811,324 3/1989 Ikedo et al. ............ 369/195 X

OTHER PUBLICATIONS

Patent Abstracts of Japan, unexamined applications, P field, vol. 5, No. 142, Sep. 8, 1969, (Kokai-No. 56–88 953).
Patent Abstracts of Japan, unexamined applications, P field, vol. 9, No. 177, Jul. 23, 1985, (Kokai-Nos. 60–50 759 and 60–50 761).

*Primary Examiner*—Robert L. Richardson
*Attorney, Agent, or Firm*—Armstrong, Nikaido, Marmelstein, Kubovcik & Murray

[57] ABSTRACT

An apparatus for reproducing signals from both sides of a disc which comprises a detector for detecting that the signal reproduction side of the disc opposed to the pickup is being changed over from one side to the other side, and a device for notifying the user that the reproduction side is being changed over according to an output signal from the detector. The notifying device enables the user to properly recognize the state of the pickup during the travel thereof between the both sides of the disc.

14 Claims, 18 Drawing Sheets

APPARATUS FOR REPRODUCING SIGNALS FROM BOTH SIDES OF DISCS

FIELD OF THE INVENTION

The present invention relates to an apparatus for reproducing information such as audio signals or video signals from both sides of discs in succession, i.e. first from one side of the disc and subsequently automatically from the other side thereof.

BACKGROUND OF THE INVENTION

Audio signals are reproduced from both sides of records in succession using conventional record players by reproducing signals from one side of the record first, then removing the record from the player, placing the record as turned upside down on the player and reproducing signals from the other side. This procedure is very cumbersome.

Accordingly, Examined Japanese Patent Publication SHO 62-4762 proposes a record player which is adapted to reproduce signals from both sides of a record in succession automatically. With reference to FIG. 32, the proposed record player comprises a linear tracking arm 109 having a pickup, and U-shaped guide means 110 for transferring the arm from one side of the record to the other side. After the record has been played for reproduction from one side by the pickup, the linear tracking arm is transferred to the other side by the guide means, and the record is played for the other side by reversely rotating the record drive motor.

When the record player is used for signal reproduction from both sides of the record in succession, no reproduced signal is obtained during the transfer of the linear tracking arm from one side of the record to the other side thereof. During this period, therefore, the user is unable to recognize whether the arm is being transferred or the reproduction is interrupted owing to a malfunction of the player.

On the other hand, a disc player has been proposed which is adapted for use with discs having audio signals and address data recorded thereon in the form of digital signals and in which the position of the pickup is indicated during signal reproduction (Unexamined Japanese Patent Publication SHO No. 60-50761). With reference to FIG. 31 showing the construction of the disc player, the signals read out of a disk 1 by a pickup 2 are fed to a loudspeaker 105 via a demodulator circuit 103 and a D/A converter 104 for the reproduction of audio signals recorded on the disc 1. The output signal from the demodulator circuit 103 is fed to an address detection circuit 106 to extract address data recorded along with the audio signal. The address data is sent to a control circuit 107 for controlling the rotation of the disc and the feed of the pickup 2 and then to a pickup position indicator 108, which in turn indicates the position of the pickup relative to the disc.

This pickup position indication system will be convenient for use in the above-mentioned apparatus for reproducing signals from both sides of discs for indicating the position of the pickup during signal reproduction. However, during the transfer of the pickup from one side of the disc to the other side, the system fails to indicate the position of the pickup since no address signal is available during this period. Accordingly, there still remains the problem that the user is unable to distinguish between the transfer of the pickup from one side of the disc to the other side and an abnormality occurring in signal reproduction.

SUMMARY OF THE INVENTION

An object of the present invention is to provide an apparatus for reproducing signals from both sides of a disc which comprises means for detecting that the signal reproduction side of the disc opposed to the pickup is being changed over from one side to the other side, and means for notifying the user that the reproduction side is being changed over according to an output signal from the detecting means, the notifying means thus enabling the user to properly recognize the state of the apparatus.

Another object of the invention is to provide an apparatus of the type stated above and comprising U-shaped guide means for transporting the pickup wherein when a pickup inversion instruction is given to pickup drive means, the reproduction side change-over detecting means operates and the notifying means indicates the direction of transport of the pickup in accordance with the instruction.

Another object of the invention is to provide an apparatus for reproducing signals from both sides of a disc which comprises side data detecting means for reading side data from the signal recording face of the disc, means for detecting the side of the disc opposed to the pickup, and a display for showing the side data when the side data is recorded on the disc and for showing the content of an output from the side detecting means when no side data is recorded on the disc.

Still another object of the invention is to provide an apparatus for reproducing signals from both sides of a disc wherein the pickup is adapted for random access to both sides of the disc based on side data recorded on the disc.

The reproduction apparatus of the present invention includes the reproduction side change-over detecting means and the means for notifying the user that the reproduction side is being changed over according to an output signal from the change-over detecting means, so that the notifying means enables the user to properly recognize the transfer of the pickup from one side of the disc to the other side when the pickup is so transported.

DETAILED DESCRIPTION OF EMBODIMENTS

Basic Construction

Figure 1:
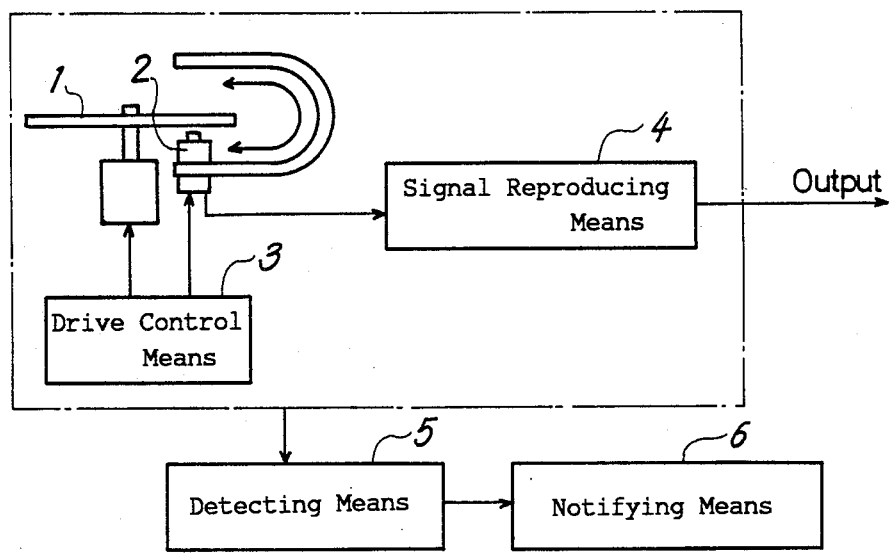
FIG. 1 is a block diagram showing the basic construction of characteristic portion of the reproduction apparatus of the invention.

FIG. 1 shows the basic construction of the apparatus of the invention for reproducing signals from both sides of discs. The rotation of the disc 1 and the feed or transport of a pickup 2 are controlled by drive control means 3. The output signal of the pickup 2 is fed to signal reproduction means 4, which feeds a reproduced signal to a display or a loudspeaker. When the reproduction side of the disc is being changed over from one side to the other side, a change-over detecting means 5 detects the change-over according to the output signal, for example, of the drive means 3 or the reproduction means 4. The detection means 5 delivers an output signal to informing or notifying means 6, such as a display, speaker or the like, which enables the user to recognize that the reproduction side is being changed over.

Described below are several optical disc players embodying the invention and having the above basic construction.

These disc players have a pickup transport assembly which will be described below with reference to FIGS. 2 to 6. The construction of this assembly is common to these players.

Pickup Transport Assembly

Figure 2:
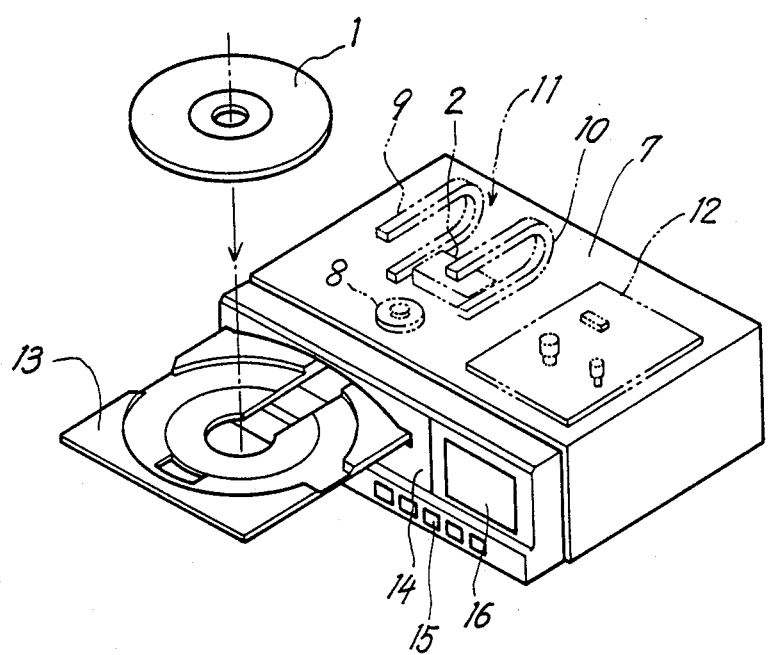
FIG. 2 is a perspective view showing the appearance of a disc player.

FIG. 2 shows the appearance of a video disc player. A cabinet 7 in the form of a flat rectangular parallelepiped houses a turntable 8 for drivingly rotating an optical disc 1, a pickup transport assembly 11 for moving the pickup 2 along a pair of U-shaped guide rails 9, 10, and a circuit board 12 provided with electric circuits such as drive control circuit for these components and a video signal processing circuit. A disc tray 13 for placing the disc 1 thereon is provided at an opening in a front panel 14 and is movable into or out of the cabinet. The front panel 14 is provided with a plurality of operation keys 15 and an LED display panel 16 for showing the state of the player in operation.

The pickup 2 comprises an optical system including a semiconductor laser, objective lens and the like, a converter for converting an optical signal to an electric signal, etc. With reference to FIGS. 3 to 6, the pickup 2 is mounted on a support base 17, which has at its respective opposite sides a pair of pinions 19, 20 drivingly rotatable by a feed motor 18, and a pair of guide rollers 21, 22.

The guide rails 9, 10 comprise upper straight portions 9a, 10a extending along the upper side of the disc positioned in place, lower straight portions 9c, 10c extending along the lower side of the disc, and circular arc connecting portions 9b, 10b interconnecting the respective pairs of the straight portions, respectively. Each guide rail is U-shaped in its entirety. The guide rails 9, 10 are fixed to an upper chassis 27 and a lower chassis 28. The guide rails 9, 10 are respectively formed in the inner side with racks 23, 24 meshing with the pinions 19, 20, and guide grooves 25, 26 extending along the racks for the guide rollers 21, 22 to fit in.

The upper and lower chassis 27, 28 are respectively provided with a pair of guide poles 29, 30 extending in parallel to the respective straight portions a, 10c of the guide rail 10. The pickup support base is formed in its bottom side with a guide bore 31 for the guide poles 29, 30 to fit in.

Figure 4:
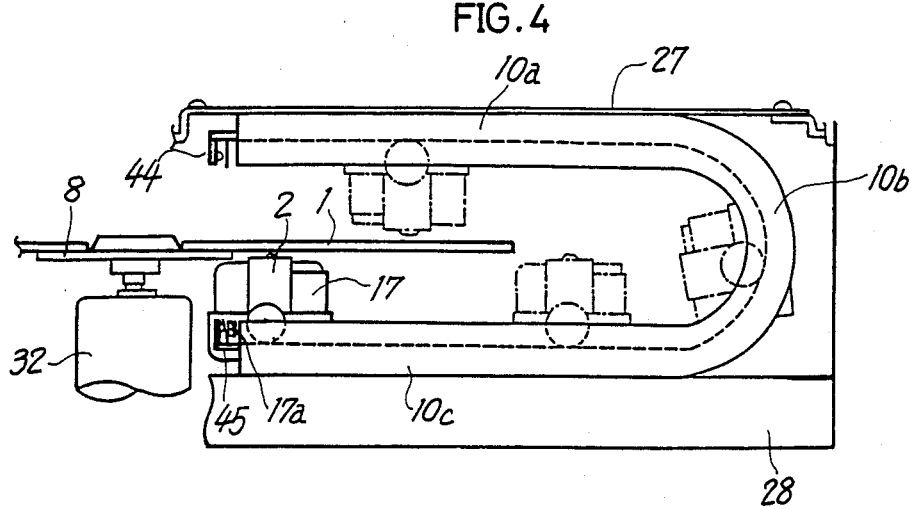
FIG. 4 is a side elevation of the pickup transport assembly.
Figure 5:
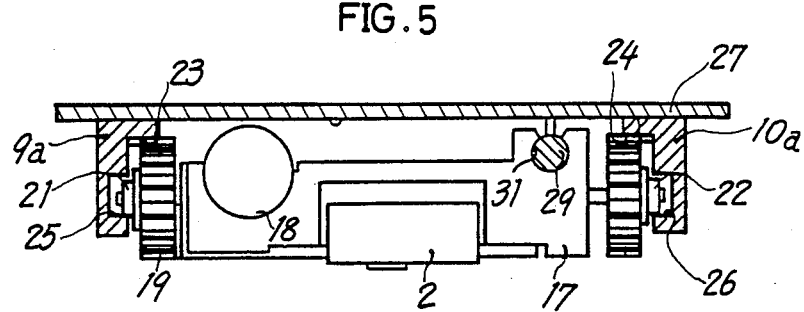
FIG. 5 is a sectional view showing the upper half of the pickup transport assembly.
Figure 6:
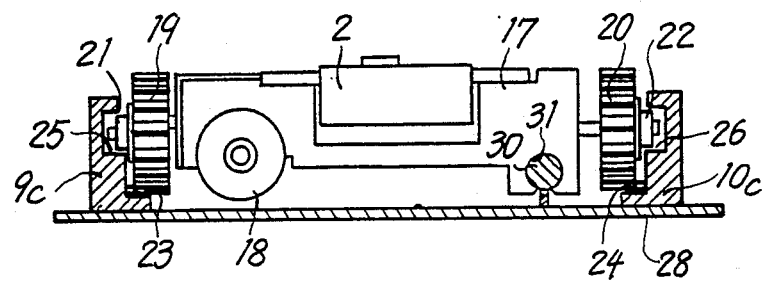
FIG. 6 is a sectional view showing the lower half of the pickup transport assembly.

As seen in FIG. 4, the turntable 8 is driven by a spindle motor 32.

The feed motor 18, when driven, drives the support base 17 on the guide rails 9, 10. During travel on the lower straight portions 9c, 10c, the support base is guided straight by the guide pole 30 fitting in the guide bore 31, whereby the lower side of the disc 1 is scanned. During travel on the upper straight portions 9a, 10a, the support base 17 is guided along straight by the guide pole 29 fitting in the bore 31, whereby the upper side of the disc 1 is scanned. The lower and upper sides of the disc can be scanned in succession by the travel of the base 17 along the connecting portions 9b, 10b of the guide rails.

As shown in FIG. 4, the guide rail straight portions 10a, 10c are provided with an upper lead-in switch 44 and a lower lead-in switch 45, respectively, at their ends close to the disc inner periphery. The pickup support base 17 has a lug 17a for actuating the switches 44, 45.

Signal Format

The signal recording format of the optical disc will be described next.

Figure 7:
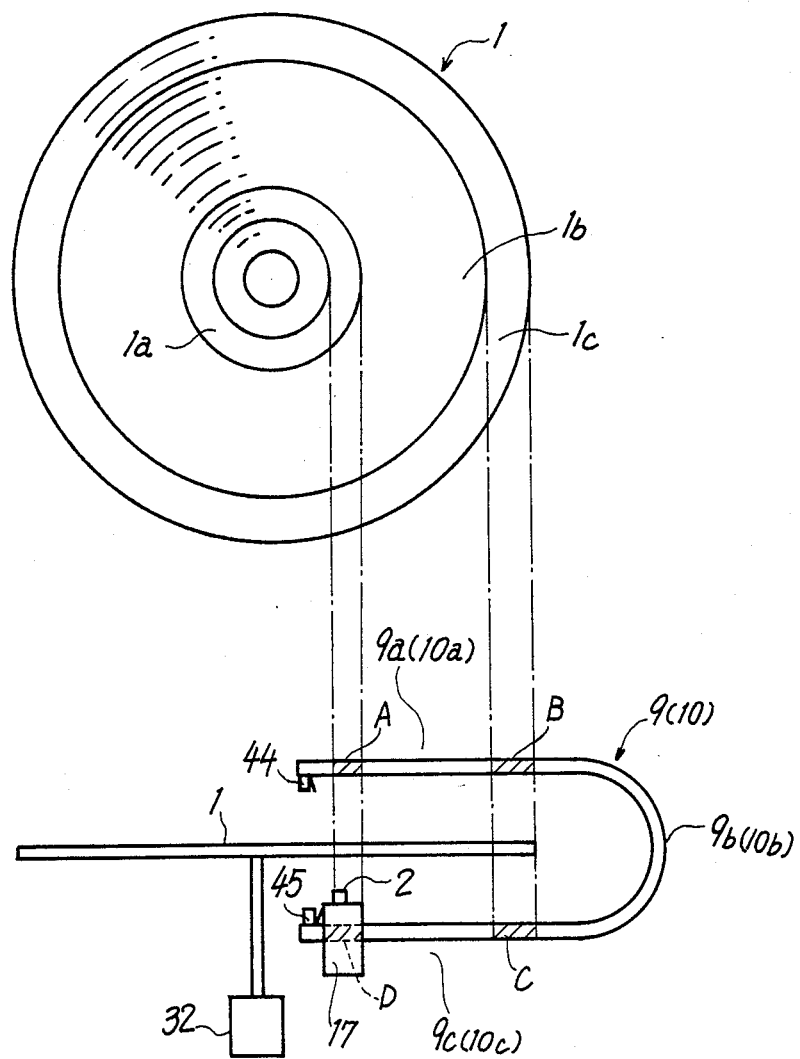
FIG. 7 is a diagram illustrating the relationship between the signal recording face and the position of the pickup.

With reference to FIG. 7, the signal recording face of the disc 1 has three areas: a lead-in area 1a along the inner periphery of the disc, a lead-out area 1c at the outer periphery of the disc, and a program area 1b between these two areas 1a, 1c. The lead-in area 1a comprises about 900 signal tracks. Each of the tracks has recorded therein a lead-in signal designating the data recording start location at the 17th and 18th horizontal scanning lines (17H, 18H) in the vertical blanking period of video signals. The lead-out area 1c comprises about 600 signal tracks, each of which has recorded therein a lead-out signal designating the data recording completion location at the 17th H and 18th H in the vertical blanking period. The program area 1b has recorded therein video signals at a constant linear or angular velocity from inner periphery toward outer periphery, along with various items of code data as will be described later.

More specifically, in the case of CLV (constant linear velocity) discs, the chapter number indicating a program section is recorded at the 18th H of the vertical blanking period of the program area 1b, and program time indicating the duration of reproduction from the program area start point is recorded at the 17th H and 18th H. In the case of CAV (constant angular velocity) discs, a video signal frame number is recorded at the 280th H and 281st H of the vertical blanking period instead of the program time.

With reference to FIG. 7, when the support base 17 is positioned at an area A or D toward the disc inner periphery of the upper straight portions 9a, 10a or lower straight portions 9c, 10c of the guide rails 9, 10, the pickup 2 detects the lead-in signal, whereby the start of reproduction of the program area is detected. Further when the support base 17 is positioned at the end area B or C toward the disc outer periphery of the upper straight portions 9a, 10a or lower straight portions 9c, 10c of the rails 9, 10, the pickup 2 detects the lead-out signal, whereby the completion of reproduction of signals from the recording face is detected.

When the lower side, for example, of the disc is to be played, the spindle motor 32 is rotated forward, and the feed motor is then driven to move the support base 17 to the ends toward the disc inner periphery of the lower straight portions 9c, 10c of the guide rails 9, 10. Upon the actuation of the lower lead-in switch 45, the feed motor is reversely rotated, thereby causing the pickup 2 to start scanning the lead-in area 1a of the disc 1. When the spindle motor 32 has reached a speed (1800 r.p.m.) specified for signal reproduction during the scanning, the lead-in signal is read out. Regardless of whether the disc 1 is a CLV disc or CAV disc, the speed of rotation of the disc specified for the reproduction of the lead-in area is 1800 r.p.m., so that the lead-in signal can be read out irrespective of the kind of disc. Upon reading the lead-in signal, the pickup 2 moves out of the lead-in area 1a by repeating a track jumping action to start scanning the program area 1b.

When the upper side of the disc is to be played, the spindle motor 32 is rotated in a direction opposite to the direction for the disc lower side, the support base 17 is then moved toward the ends toward the disc inner periphery of the upper straight portions 9a, 10a of the guide rails 9, 10, and the feed motor is reversely rotated upon the actuation of the upper lead-in switch 45, causing the pickup to scan the lead-in area 1a and the program area 1b in the same manner as above.

Affixed to each side of the disc 1 radially inwardly of the lead-in area 1a is a label representing the content of the record on the other side thereof. Thus, the label affixed to the A side of the disc 1 bears information as to what is recorded on the B side, while the label affixed to the B side bears information as to what is recorded on the A side.

Figure 31:
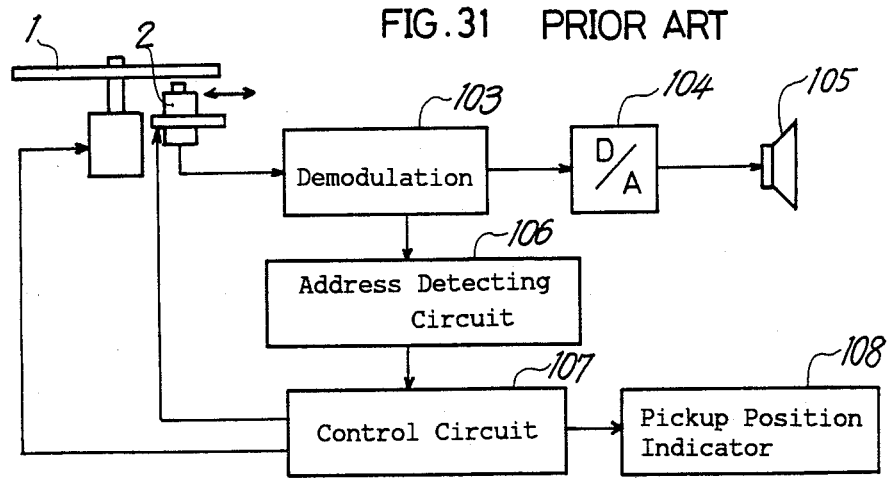
FIG. 31 is a block diagram showing the construction of a conventional disc player.
Figure 32:
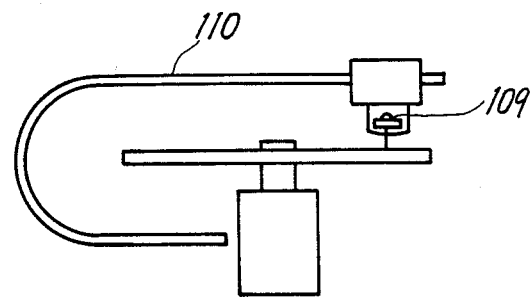
FIG. 32 is a front view schematically showing a conventional record player for double-face reproduction.

In this way, the signal recording side of the disc and the side bearing the corresponding label are in opposite relationship for the following reason. With conventional single-side reproduction apparatus, the pickup 2 is disposed on the lower side of the disc 1 as seen in FIG. 31, whereas when the disc is to be placed in the apparatus, the user can recognize the label as affixed to the other side of the disc.

The disc is loaded into the player of the invention usually with the A side down, i.e., with the label bearing the data as to the A side positioned up.

First Embodiment

A first embodiment of the invention will be described with reference to FIGS. 8 to 13.

Figure 8:
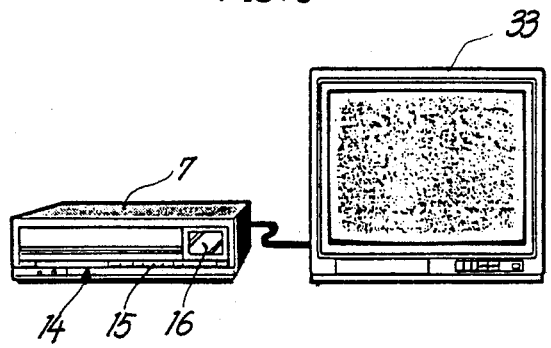
FIG. 8 is a perspective view showing the disc player and a display as interconnected.
Figure 9:
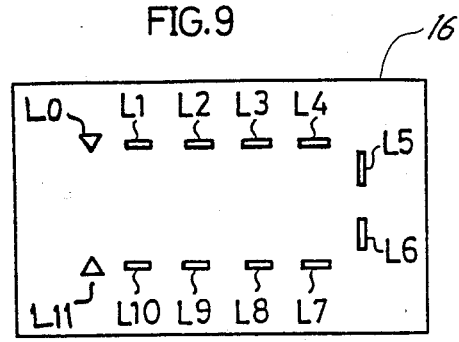
FIG. 9 is a front view of an LED display panel.

As shown in FIG. 8, the embodiment, i.e. disc player, is used as connected to a display 33 which is a TV receiver. The screen of the display 33 and an LED display panel 16 provided on the front panel of the display show the state of the disc player in operation as will be described later. As shown in FIG. 9, the LED display panel 16 comprises a pair of character indicators. L0, L11 and first to tenth LED indicators L1 to L10 which are arranged in conformity with the form of the U-shaped guide rails.

Figure 10:
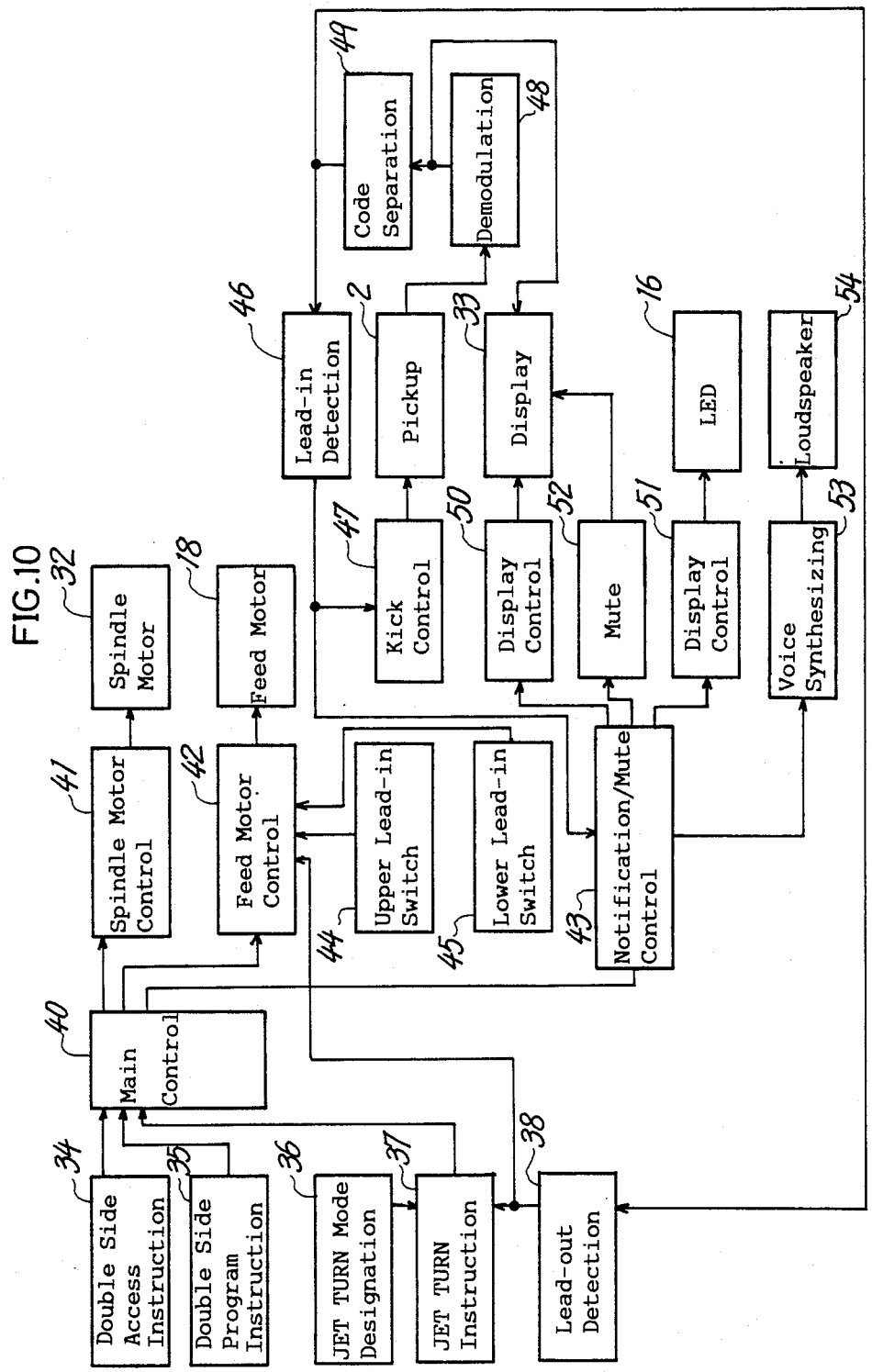
FIG. 10 is a block diagram showing the overall construction of the disc player.
Figure 11:
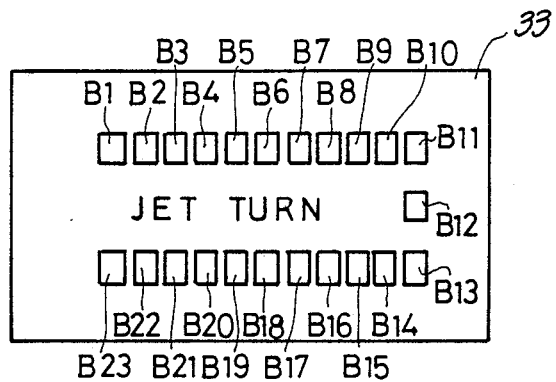
FIG. 11 is a diagram showing a representation on the display.

FIG. 10 shows an arrangement for notifying the user of the state of the disc player in operation.

A double-side access instructing means 34 gives a double-side access instruction for reproducing the desired chapter, for example, on B side during reproduction from A side by manipulating a key on the operation panel. A double-side program instructing means 35 gives a double-side program instruction, for example, for reproducing a specified chapter on B side after the completion of reproduction of a specified chapter on A side according to a program preset by the user with keys. JET TURN mode designating means 36 comprises a key which is to be depressed for setting a "double-side successive reproduction mode" wherein both sides of the disc are to be played automatically in succession. The inversion of the pickup from one side of the disc to the other side is herein termed "JET TURN." JET TURN instructing means 37 gives a JET TURN instruction when the lead-out signal on A side is detected by a lead-out detecting circuit 38 in the double-side successive reproduction mode.

In contrast with this mode, a "single-side reproduction mode" is also provided in which only one side of the disc is played, and the player is then stopped. When the lead-out signal is detected in this case, the pickup is returned to innermost peripheral portion of A side.

The instruction from the instruction means 34, 35 or 37 is first sent to a main control circuit 40, which prepares a control signal in accordance with the reproduction mode designated. The signal is then fed to a spindle motor control circuit 41, feed motor control circuit 42 and notice/mute control circuit 43.

The spindle motor control circuit 41 prepares a control signal for forwardly rotating the spindle motor 32 for reproduction from the disc lower side (A side) or for reversely rotating the motor 32 for reproduction from the upper side (B side) and feeds the signal to the spindle motor 32. The feed motor control circuit 42 controls the start, stop and speed of the feed motor 18.

For example when the player is initiated into double-side successive reproduction operation by depressing the key concerned, the pickup 2 is quickly transported to the innermost peripheral portion of the disc on the lower side thereof by the feed motor 18 which is rotated at a high speed to actuate the lower lead-in switch 45. The pickup 2 then starts scanning the lead-in area, and at the same time, the feed motor 18 is initiated into low-speed rotation for the pickup to read out the lead-in signal. The lead-in signal read out is detected by a lead-in detecting circuit 46, this indicating that the spindle motor 32 has reached the specified speed of rotation for reproduction from the program area, whereupon a kick control circuit 47 initiates the pickup 2 into a jumping action. This action is repeated until the pickup 2 moves out of the lead-in area. Consequently, the pickup 2 rapidly moves out of the lead-in area with the spindle motor 32 maintained at the speed required for signal reproduction from the program area. The departure from the lead-in area is recognized by code data, such as chapter number or program time, which is detected instead of the lead-in signal.

After moving out of the lead-in area, the pickup 2 reproduces signals from the program area on the disc lower side, and the reproduced video signals are demodulated by a demodulator circuit 48 and then sent to the display 33 to produce images.

The lead-out area of the disc 1 is thereafter scanned to read out the lead-out signal, whereupon the feed motor 18 is brought into high-speed rotation, causing the pickup 2 to perform an upward JET TURN movement from the disc lower side toward its upper side. The pickup quickly reaches the innermost peripheral portion of the disc upper side, actuating the upper lead-in switch 44, whereupon the feed motor 18 is brought into reverse low-speed rotation for reproduction from the upper side. During the upward JET TURN, the spindle motor 32 is reversed to rotate at the speed of 1800 r.p.m.

The pickup 2 subsequently moves out of the lead-in area, reproduces signals from the program area and further moves to the lead-out area to read out the lead-out signal, whereupon the pickup 2 performs a downward JET TURN movement along the guide rails to reach the innermost peripheral portion of the disc lower side. The pickup 2 remains in this position for the subsequent reproduction operation, whereby both sides are completely played in succession for reproduction.

When the pickup 2 is to perform upward JET TURN in the double-side successive reproduction mode, the lead-out signal is detected from the disc lower side, whereupon an instruction to display downward "JET TURN" (hereinafter referred to as "downward display instruction") is given to a display control circuit 50 for the display 33 and to a display control circuit 51 for the LED display panel 16. The display instruction is discontinued upon the pickup 2 moving out of the lead-in area on the disc upper side. Similarly, when the pickup 2 is to perform downward JET TURN, the lead-out signal is detected from the disc upper side, whereupon an instruction to display upward "JET TURN" (hereinafter referred to as "upward display instruction") is given.

While the player is not set for the double-side successive reproduction mode, i.e. during reproduction from one side, the double-side access instructing means 34 is likely to give an instruction to reproduce a particular chapter from the other side. Simultaneously with this, the notice/mute control circuit 43 sends a downward or upward display instruction to the display control circuits 50, 51 in this case.

In the case where the reproduction side is to be changed over according to a program preset by the double-side program instructing means 35, for example, when the reproduction of chapter Na on A side is to be followed by the reproduction of chapter Nb on B side, the notice/mute control circuit 43 gives a downward display instruction to the control circuits 50, 51 on completion of reproduction of chapter Na. Conversely when the reproduction of chapter Nb on B side is to be followed by the reproduction of chapter Na on A side, the notice/mute control circuit 43 gives an upward display instruction to the control circuits 50, 51 on completion of reproduction of chapter Nb.

When the reproduction side is changed over from one side to the other side in various modes, the lead-in area on the other side is invariably scanned to detect the lead-in signal therefrom, and the spindle motor reaches the specified speed for signal reproduction before the desired chapter on the other side is reproduced, so that in either of the above cases, the JET TURN instruction is continued until the pickup moves out of the lead-in area.

Figure 12:
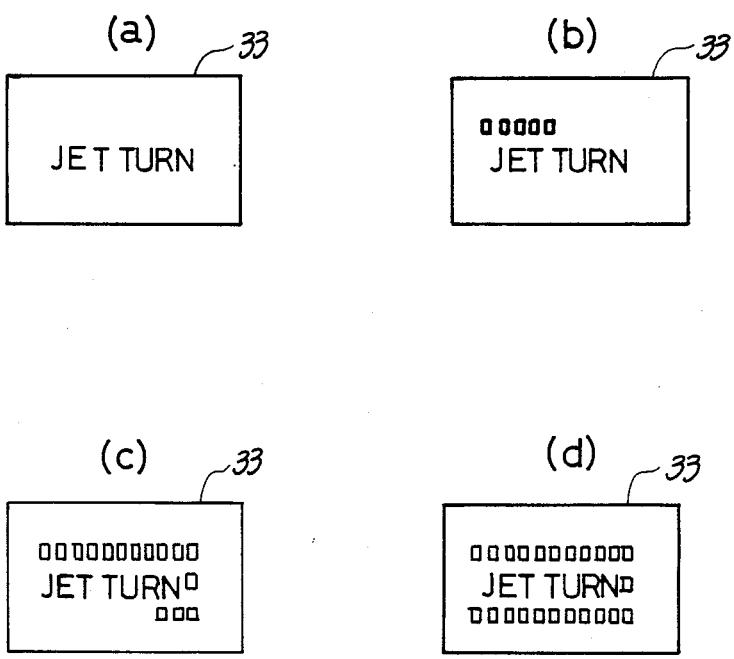
FIGS. 12 (a) to (d) are diagrams showing changes in the representation on the display.

During the operation of the display control circuit 50, a built-in character generator shows on the screen of the display 33 the seven characters of "JET TURN". Also shown are square indicator blocks B1 to B23 in a U-shaped arrangement as turned on one after another with a given period as will be described below (see FIGS. 11 and 12 (a)). More specifically, when the downward display instruction is given, the first indicator block B1 is first turned on, and the adjacent indicator blocks are thereafter turned on one after another as seen in Figs. 12 (b) and (c) until all the blocks are turned on as shown in FIG. 12 (d). The screen then resumes the initial state of FIG. 12 (a), and the indicator blocks are thereafter turned on one after another again. This operation is repeated with a predetermined period (e g., 2 seconds) while the display instruction remains. Alternatively when the upward display instruction is given, the indicator blocks are turned on one after another from block B23 toward block B1.

The LED display control circuit 51 drives the LED display panel 16 to turn on the indicators shown in FIG. 9. The character indicators L0 and L11 on the panel 16 are flickered when the downward and upward display instructions are given, respectively. The LED indicator L1 corresponds to the indicator blocks B1 to B3 on the display screen, and each of the other LED indicators L2 to L10 to two or three indicator blocks on the display 33. Accordingly, when the downward or upward display instruction is given, the LED indicators L1 to L10 are turned on one after another in the same direction as, and in synchronism with, the indicator blocks on the display 33. The indicators L0 and L11 on the panel 16 are used also for indicating the disc side accessed or being played for signal reproduction. The indicator L0 or L11 concerned is flickered for showing the access or is turned on for showing reproduction.

Figure 13:
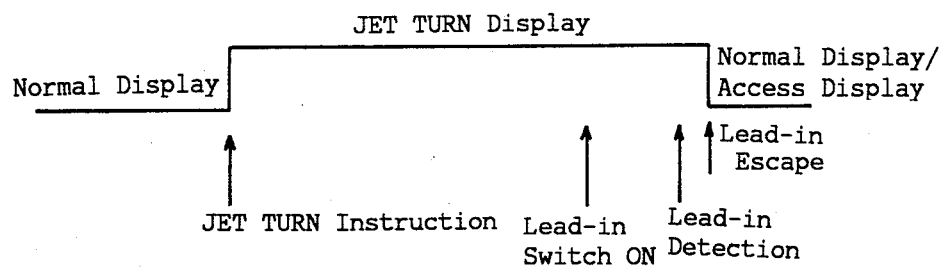
FIG. 13 is a diagram showing when to display "JET TURN"

FIG. 13 shows the duration of the display instruction. The representation "JET TURN" is turned on when the JET TURN instruction is given and held on during the period in which the lead-in switch opposed to the side to be played is turned on, the spindle motor is reversely rotated and the lead-in signal is detected until the pickup moves out of the lead-in area.

In the representation of JET TURN, the actual direction of movement of the pickup is in reverse relation to the displayed direction as shown in FIG. 12, in accordance with the reverse or opposite relationship between the label and the reproduction side thereby represented as already stated. More specifically, when the user places the disc on the player with A side, identified by the label, (actually B side) up, the disc lower side is reproduced first and the upper side is then played actually, whereas the user recognizes that the upper side is reproduced first, so that the display is given in accordance with the recognition by the user to avoid the possible error in handling the disc.

With reference to FIG. 10, a mute circuit 52 prevents the display 33 from showing the data from the pickup 2 during JET TURN of the pickup 2 and also while a specified chapter is being accessed.

The notice/mute control circuit 43 has connected thereto a voice synthesizing circuit 53 and a loudspeaker 54 for notifying the user of the JET TURN movement with a voice instead of or in addition to the representation on the display 33 as required. In this case, the notice/mute control circuit 43 gives an upward or downward display instruction to the display control circuits 50, 51 and, at the same time, issues an instruction to announce "JET TURN" to the voice synthesizing circuit 53.

The voice synthesizing circuit 53 is provided with a memory having stored therein a voice signal representing "JET TURN." In response to the announcement instruction from the notice/mute control circuit 43, the voice signal is read out of the memory and fed to the speaker 54, which announces the message "JET TURN."

Two kinds of voice signals for "JET TURN START" and "JET TURN END" can be stored in the memory to give the former message with the start of the JET TURN movement and to deliver the latter message a predetermined period of time thereafter or upon the actuation of the lead-in switch opposed to the disc side to be played.

It is also possible to deliver the messages of "RETURN TO A SIDE" or "RETURN TO B SIDE" representing the destination disc side, or to notify the user of the start and completion of JET TURN with a buzzing sound.

According to the foregoing embodiment, when the pickup performs a JET TURN movement, the user is notified of the movement by a display, LED indicators or with a voice or sound output, enabling the user to properly recognize the state of the pickup in movement. The expedient is therefore useful.

Figure 3:
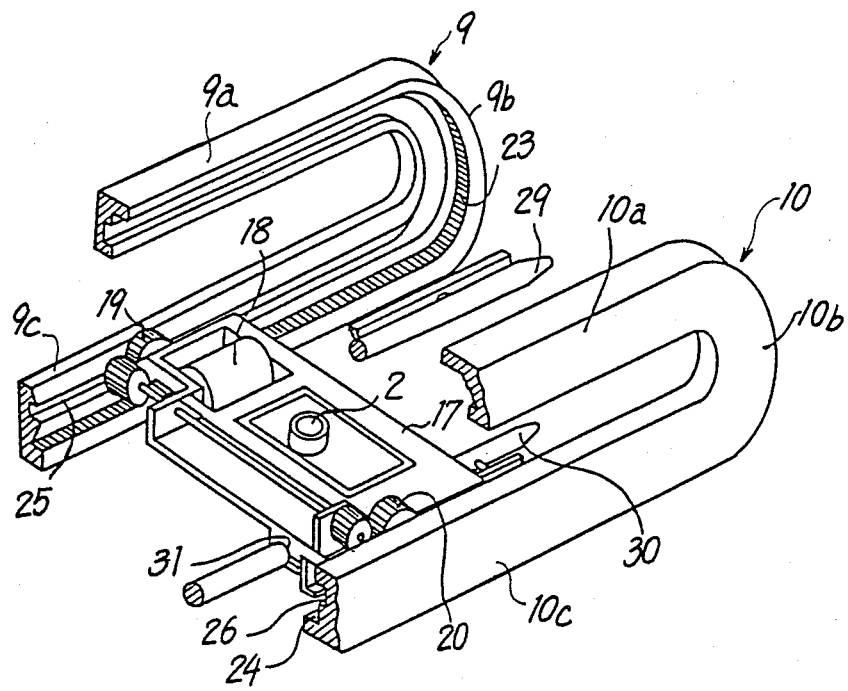
FIG. 3 is a perspective view partly broken away of a pickup transport assembly.

The method of notification of a change-over of the reproduction side described is not only useful for disc players of the type shown in FIG. 3 wherein a single pickup is movable to either side of the disc along the U-shaped guide means but is also usable for disc players which are equipped with a plurality of pickups corresponding to the number of signal recording faces to be played in succession for signal reproduction. With such a disc player, each pickup is reciprocatingly driven straight only radially of the disc. When the disc is inverted in this case for a change-over of the disc reproduction side from one side to the other side, the user is notified of the change-over.

Second Embodiment

Figure 14:
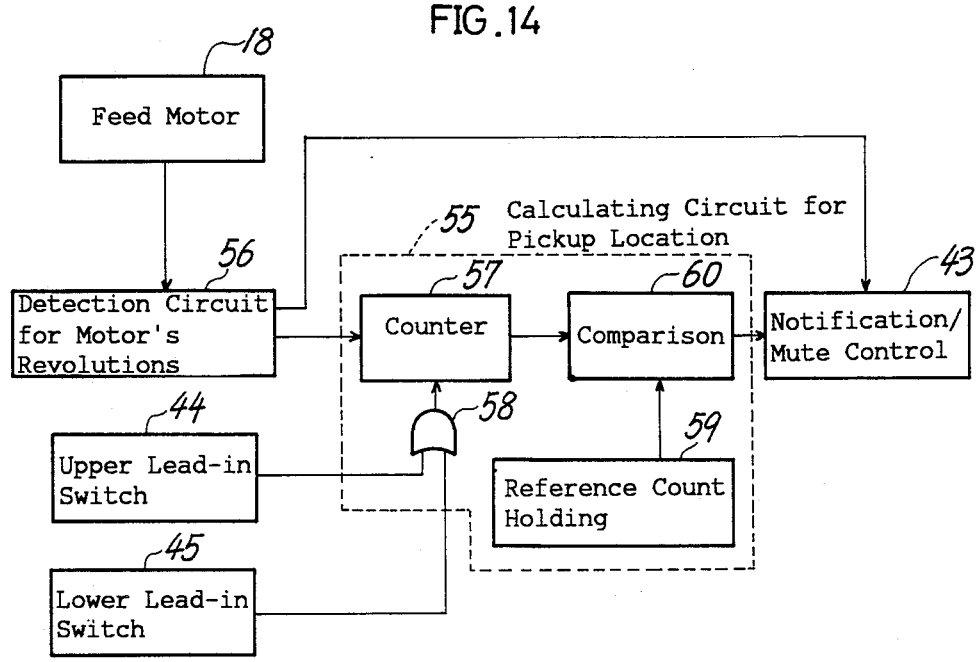
FIG. 14 is a fragmentary block diagram showing another disc player of different construction.

The circuit of FIG. 14 includes a circuit 56 for detecting the number of revolutions of the feed motor 18 and a pickup position commuting circuit 55 between the feed motor 18 and the notice/mute control circuit 43, whereby the position of the pickup 2 during JET TURN is displayed accurately.

The revolution number detecting circuit 56 detects the rotation of the feed motor 18 to produce one pulse upon every revolution of the motor.

The pickup position computing circuit 55 comprises a counter 57 for counting output pulses from the circuit 56, an OR circuit 58 for resetting the counter 57 in response to an output from the upper or lower lead-in switch 44 or 45, a reference count holding circuit 59 holding therein the reference count values to be described later, and a comparator circuit 60 for delivering to the notice/mute control circuit 43 a position signal in accordance with the position of the pickup based on the reference count value and the output from the counter 57.

For example when the reproduction from the disc lower side is to be followed by the reproduction from the upper side, the counter 57 starts counting output pulses upon the actuation of the lower lead-in switch 45. The count gradually increases with an increase in the distance of travel of the pickup. The counting operation is discontinued upon the actuation of the upper lead-in switch 44 after a JET TURN movement. Further when the pickup starts reproducing signals from the disc upper side, the count increased with an increase in the distance of travel of the pickup after the upper lead-in switch 44 has been actuated until the lower lead-in switch 45 is actuated.

The counts obtained during the travel of the pickup between the two lead-in switches 44, 45 are divided into 23 equal sections, and the ranges of counts in the respective sections are set in the reference count holding circuit 59 as the reference counts. For example, if the total count is 2300, the first section ranges from 1 to 100 counts, and the second section ranges from 101 to 200 counts. The 23 sections of counts correspond to the 23 indicator blocks shown in FIG. 11.

The comparator circuit 60 compares the current count output from the counter 57 with the reference counts and determines the section in which the current count is included. The result is forwarded to the notice/mute control circuit 43 as a position signal.

Figure 15:
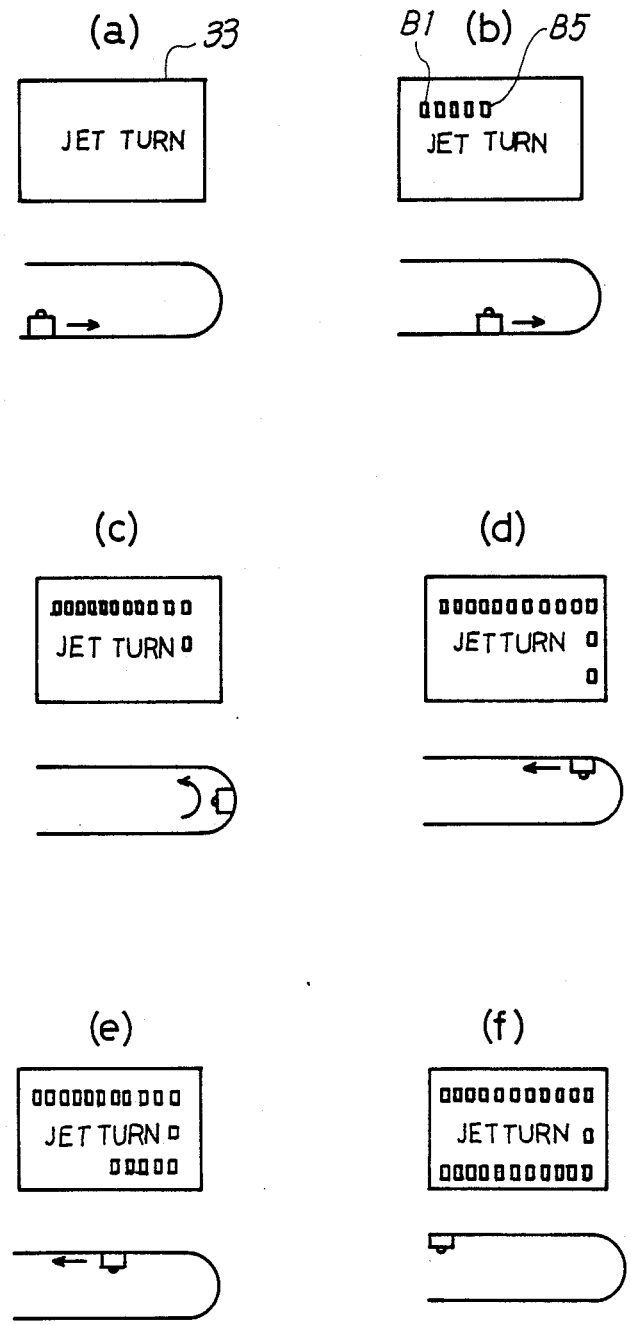
FIGS. 15 (a) to (f) are diagrams showing changes in the representation on the display.

Consequently, the display control circuit 50 turns on the indicator block B1 to the block corresponding to the section in which the current count is included (see FIG. 11), and further blocks are turned on one after another with an increase in the distance of travel of the pickup due to the subsequent JET TURN movement, as illustrated in FIGS. 15 (a) to (f). For example, when the pickup position immediately before the start of upward JET TURN corresponds to the indicator block B5, the blocks B1 to B5 are all turned on (FIG. 15 (b)), and further adjacent indicator blocks are turned on one after another with an increase in the amount of rotation of the feed motor (FIGS. 15, (c) to (e)). All the indicator blocks are turned on immediately before the upper lead-in switch is actuated after the JET TURN (FIG. 15 (f)).

When the upper lead-in switch 44 is turned on subsequently, the counter 57 is reset, and all the indicator blocks are turned off. When the pickup moves out of the lead-in area on the disc upper side while moving toward the disc outer periphery, the display resumes the usual state of screen to show the reproduced picture.

When the pickup 2 performs a downward JET TURN movement, the indicator blocks are turned on in an order reverse to the above. The LED indicators on the LED display panel 16 are of course turned on one after another in accordance with the direction and distance of travel of the pickup.

The foregoing embodiment enables the user to accurately recognize the direction of travel of the pickup and the position thereof when the pickup is brought into a JET TURN movement and is therefore useful.

Third Embodiment

Figure 16:
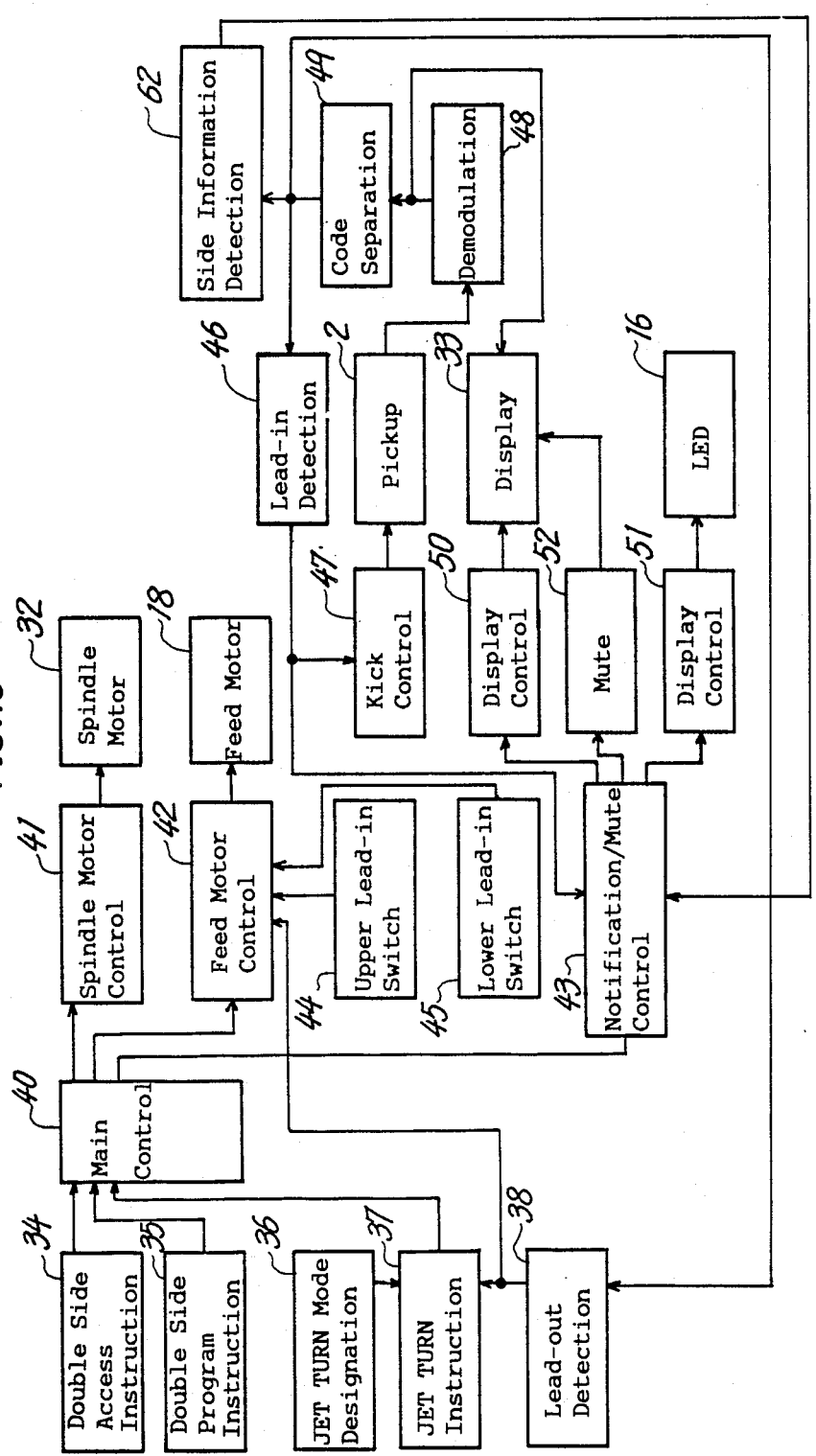
FIG. 16 is an overall block diagram showing another disc player of different construction.

FIG. 16 shows a circuit for controlling the notice/-mute control circuit 43 more ingeniously with reference to side information or data included in video signals as will be described below.

The side data is code data recorded in advance in video signals at a specified horizontal scanning line (e.g. the 16th H) in the vertical blanking period to indicate which of A side and B side has recorded the video signals.

The reproduced video signal obtained from the demodulator circuit 48 is fed to a code separating circuit 49, by which the items of data such as side data, chapter number, etc. included in the video signal are separated off. These items of code data are sent to a side data detecting circuit 62, whereby the side data only is separated off. The side data is delivered to the notice/mute control circuit 43.

When the side data detecting circuit 62 has detected that the disc is set in the player in the usual manner with its B side up, the notice/mute control circuit 43 gives the same display instruction as already described with reference to FIG. 10.

On the other hand, when the disc is placed in the player with A side up reverse to the usual orientation, the pickup 2 immediately moves to the upper side of the disc after the side data has been identified, starting reproduction from A side. After the completion of reproduction from A side, the pickup moves to the lower side for reproducing signals from B side. At this time, the notice/mute control circuit 43 gives a downward display instruction during the travel of the pickup 2 from A side to B side, and delivers an upward display instruction during the travel of the pickup 2 from B side to A side.

Consequently, the recognition of the user that a reproduction procedure has been followed from the disc upper side to the lower side matches the representation of movement of the pickup 2 on the display 33 or on the LED display panel 16.

Regardless of whether A side or B side is positioned up when the disc is loaded in the player, the above embodiment enables the user to accurately recognize the direction of movement of the pickup.

Fourth Embodiment

Figure 17:
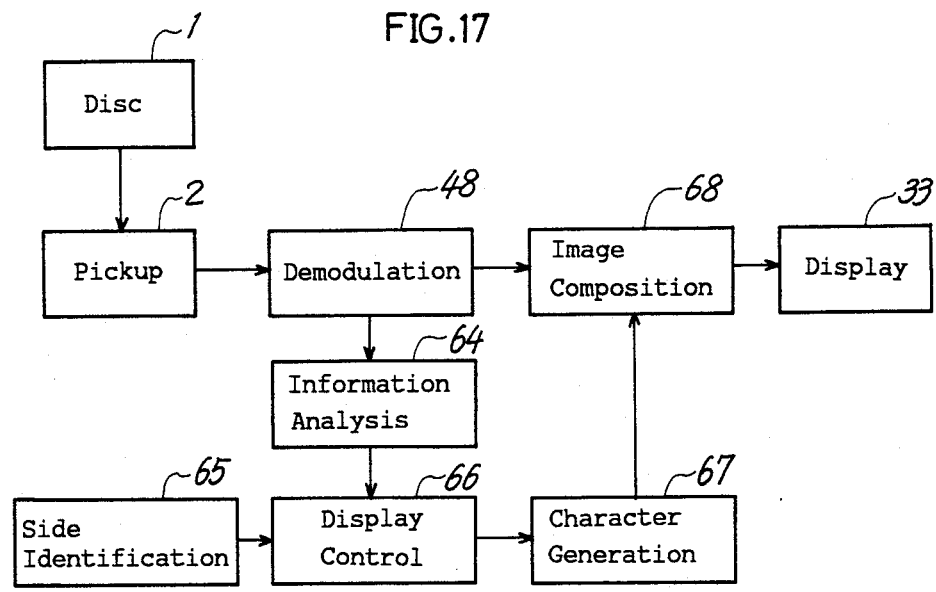
FIG. 17 is a fragmentary block diagram showing another disc player of different construction.

FIG. 17 shows an embodiment which is adapted to show on the display which of A side and B side, or which of the upper and lower sides of the disc is opposed to the pickup for signal reproduction.

The output terminal of the demodulator circuit 78 is connected to a data analysis circuit 64 which comprises the code separating circuit 49 and side data detecting circuit 62. A circuit 65 for identifying the side opposed to the pickup is provided, for example, by connecting the output terminals of the upper lead-in switch 44 and the lower lead-in switch 45 to the R terminal and S terminal of an R-S flip-flop, the arrangement being such that the R terminal is at high level when the upper lead-in switch 44 is actuated, and that the S terminal is at high level when the lower lead-in switch 45 is actuated. The side identifying circuit 65 therefore produces a low-level side identifying output for reproduction from the disc upper side, and a high-level side identifying output for reproduction from the disc lower side.

The output terminals of the data analysis circuit 64 and the side identifying circuit 65 are connected to a display control circuit 66. When the disc has recorded thereon side data, the side data from the analysis circuit 64 is fed by the display control circuit 66 to a character generator circuit 67 disposed subsequent to the circuit 66. When no side data is recorded on the disc, the circuit 66 feeds the side identifying signal from the circuit 65 to the character generator circuit 67.

The character generating circuit 67 produces a character signal "SIDE 1" when receiving the side data representing A side, or a character signal "SIDE 2" when receiving the side data representing B side. The character generating circuit 67 further produces a character signal "SIDE U" when receiving the high-level side identifying signal, or a character signal "SIDE L" when receiving the low-level side identifying signal. Thus, the reproduction side recognized by the user matches the actual reproduction side.

The character signal from the character generator circuit 67 is combined with the output signal from the demodulator circuit 48 at a video composition circuit 68, which feeds the resulting composite signal to the display 33. Accordingly, the characters concerned are superimposed on the image on the screen of the display 33.

Figure 18:
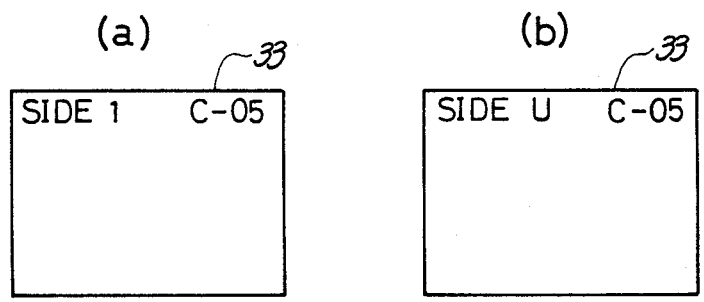
FIGS. 18 (a) and (b) are diagrams showing representations of the display.

FIGS. 18 (a) and (b) show examples of characters on the display 33. When the side data is recorded on the disc, "SIDE 1" (or "SIDE 2") and the chapter number "C-05" separated off by the data analysis circuit are displayed as shown in FIG. 18 (a). When no side data is recorded on the disc, "SIDE U" (or "SIDE L") and the chapter number are displayed as seen in FIG. 18 (b). When a desired chapter is to be accessed, the side of the chapter and the chapter number are displayed under the representation of FIG. 18.

Figure 19:
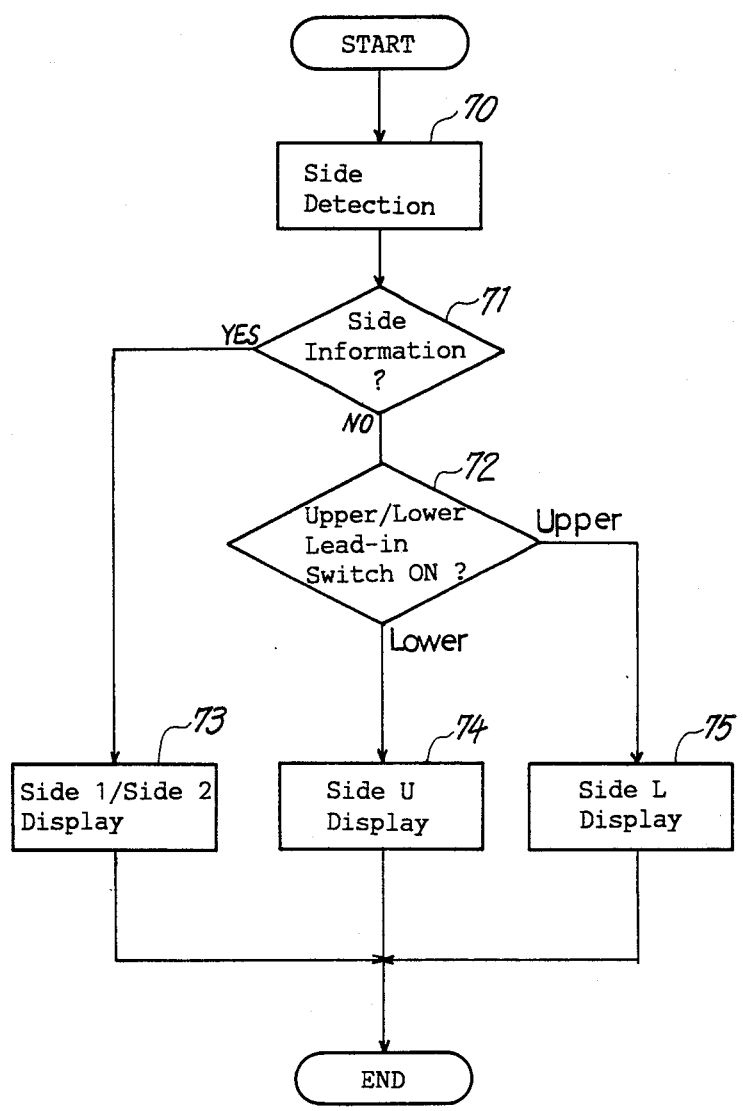
FIG. 19 is a flow chart showing the operation of the player of FIG. 17.

FIG. 19 shows the operation of the display control circuit 66. After the side detecting step 70, step 71 inquires whether side data is present. If there is no side data, step 72 inquires which of the upper and lower lead-in switches was actuated last. In accordance with the result, display set 73, 74 or 75 follows.

The embodiment of FIG. 17 enables the user to realize program reproduction or access reproduction easily with reference to the display 33 showing the side data as to A side or B side, or upper side or lower side.

Fifth Embodiment

Figure 20:
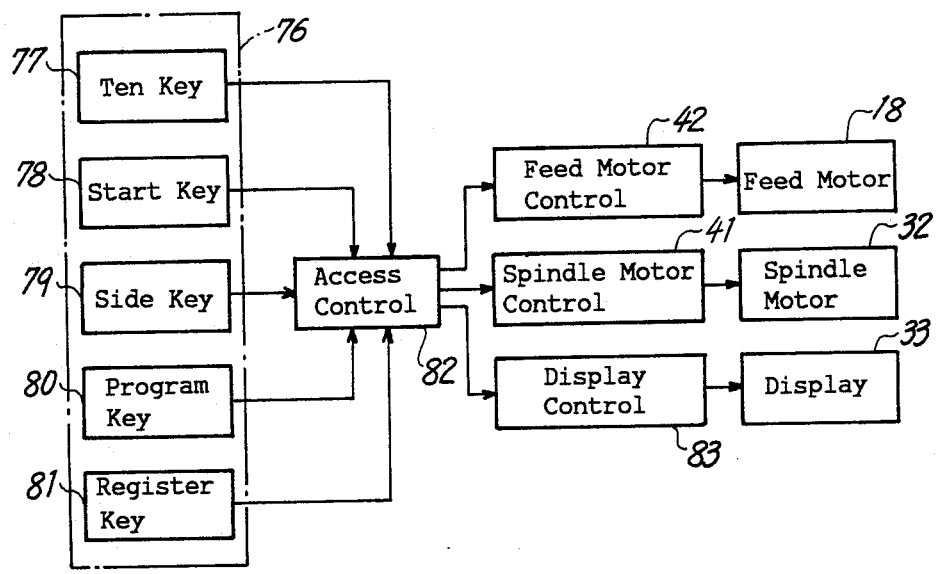
FIG. 20 is a fragmentary block diagram showing showing another disc player of different construction.

The embodiment shown in FIG. 20 is adapted for random access to both sides of the disc.

Address designating means 76 for specifying the address to be accessed comprises number entry keys (ten keys) 77 for entering the frame number to be accessed, program time concerned or the desired chapter number, a start key 78 for starting access, a side key 79 for changing over the reproduction side to be accessed, a program key 80 for setting a program, and a register key 81 for registering the program. The output ends of these keys are connected to an access control circuit 82 for preparing control signals for the feed motor control circuit 42, spindle motor control circuit 41 and display control circuit 83.

First with reference to FIGS. 20 and 21, how to designate an address for random access using some of the number entry keys 77 and the side key 79 will be described. When an address display mode is set during reproduction from A side or B side of the disc, the display 33 shows the side data as to the side for the current reproduction and the chapter number concerned as shown in the first line in FIG. 21 (a). Instead of the chapter number, the program time or frame number can be displayed. Next, the address to be accessed (e.g. chapter "02") is fed to the access control circuit 82 using number entry keys 77, whereby the representation in the second line of FIG. 21 (a) is given, and the chapter "02" on A side is specified. If this chapter "02" is present on B side, the side key 79 is depressed, whereby the side data is changed to "SIDE 2" representing B side as shown in the second line of FIG. 21 (b). Thus, when the chapter number only is entered, A side is designated unconditionally, and the side key 79, when depressed, specifies B side. Consequently, the address and side are designated.

After the desired access data has been completely entered, the start key 78 is depressed, whereupon the access control circuit 82 feeds a control signal to the feed motor control circuit 42 and the spindle motor control circuit 41. The rotation of the feed motor 18 and the spindle motor 32 is thereby controlled, bringing the pickup to the address to be accessed and specifying the direction of rotation of the disc according to the side data.

The access to be made based on the data of FIG. 21 (b), for example, will be described. While the feed motor 18 is in low-speed rotation, causing the pickup to scan the chapter "C-01" on the disc lower side, the start key 78 is depressed, whereupon the feed motor 18 is brought into high-speed rotation, permitting the pickup to perform an upward JET TURN movement and reach the innermost peripheral portion of the disc upper side. During this movement, the spindle motor 32 rotates reversely. The feed motor 18 is thereafter slowed down for the pickup to read out the lead-in signal from the disc upper side (B side). This indicates that the spindle motor 32 has reached the specified speed for reading out signals, whereupon the pickup starts scanning the chapter "C-02" at the specified address.

A program mode will be described next in which a plurality of desired chapters are reproduced in succession using memories having stored therein the addresses of the chapters.

Figure 22:
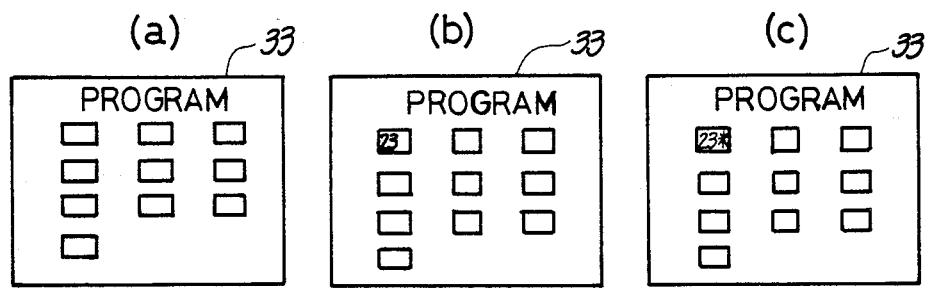
FIGS. 22 (a), (b) and (c) are diagrams showing representations on the display when a program is set.

When the program key 80 is depressed, the display control circuit 83 shows on the display 33 an image for entering a program as seen in FIG. 22 (a), whereby a program entering mode is set. The circuit 83 has ten program setting memories, and ten blocks are shown on the screen accordingly. Next, the address to be accessed (e.g. chapter "23") is set by number entry keys 77, and the side data indicating A side or B side having the address is entered by the side key.

The side data is entered in the following manner. For example when reproduction from A side (SIDE 1) is being done during program setting to specify the chapter to be accessed on A side, the chapter number "23" is left displayed as seen in FIG. 22 (b) without depressing the side key 79. Alternatively, if the depressed. This adds the mark * to the rear end of the number "23" on the display as seen in FIG. 22 (c) to display "23 * ". Thus, if the chapter to be set for access is present on the disc side which is opposed to the pickup, the address only is entered, whereas the side key is depressed only when the address is on the other side.

After the address data including the side data has been completely set and displayed using number entry keys 77 and side key 79, the register key 81 is depressed, whereupon the address data is stored in the memory within the access control circuit 82. Such address data can be entered repeatedly up to ten times.

When all the desired items of address data have been completely registered in this way, the pickup moves according to the program data in the memories to realize random access to both sides of the disc.

Figure 21:
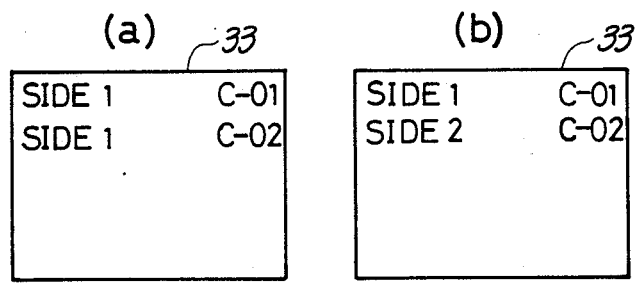
FIGS. 21 (a) and (b) are diagrams showing representations on the display when a chapter is designated.

With reference to FIGS. 21 and 22, the display portions which are waiting for data input may be flickered, or the representation of FIG. 22 may be given also during the reproduction of the program in the program mode, with the portion of the program being reproduced flickered. This realizes a readily recognizable display. In this case, the program key 80 used in the program entering mode is usable also as a display on-off switch. The address designating means 76 including the number entry keys 77, start key 78, etc. may of course be provided on the main body of the video disc player or on a remote control unit.

Figure 23:
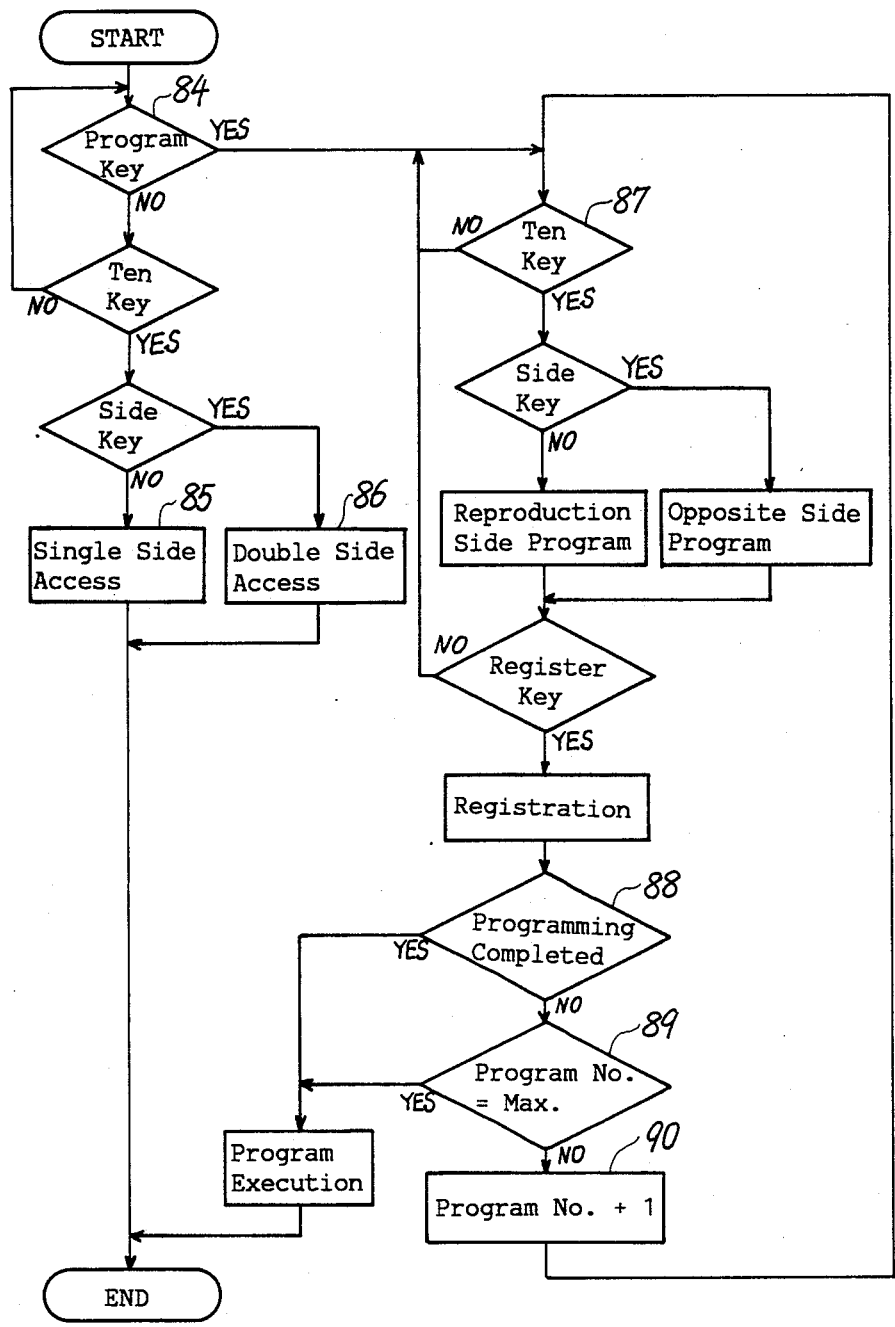
FIG. 23 is a flow chart showing the operation of the player of FIG. 20.

FIG. 23 shows the operation of the access control circuit 82. Step 84 inquires whether the program key has been depressed. If the answer is in the negative, the number entry keys and the side key are checked. If the side key has been depressed, the access mode is set in step 86 for both sides. When the side key has not been manipulated, the access mode is set for one side in step 85. If the answer to the inquiry of step 84 is affirmative, the number entry keys are checked in step 87, and the side key is thereafter checked. If the side key has not been depressed, the program mode is set for a case wherein the address to be accessed is present on the disc side currently subjected to reproduction. If otherwise, the program mode is set for a case wherein the contemplated address is present on the opposite disc side. Subsequently, the program is registered by depressing the register key. When the program is found to have been registered in step 88, the program is executed. If otherwise, step 89 inquires whether the number of address data items already programmed (program number) has reached the number of memories available (e.g. ten). When the answer to the inquiry is negative, the program number is increased by 1 in step 90, whereupon the sequence returns to step 87. If the answer is affirmative, the program is executed. Consequently, even if the program setting has not been completed, the program is executed automatically provided that the program number has reached "10."

According to the present embodiment, the combination of the designated address and the side data realizes random access to both sides of the disc.

Sixth Embodiment

Figure 24:
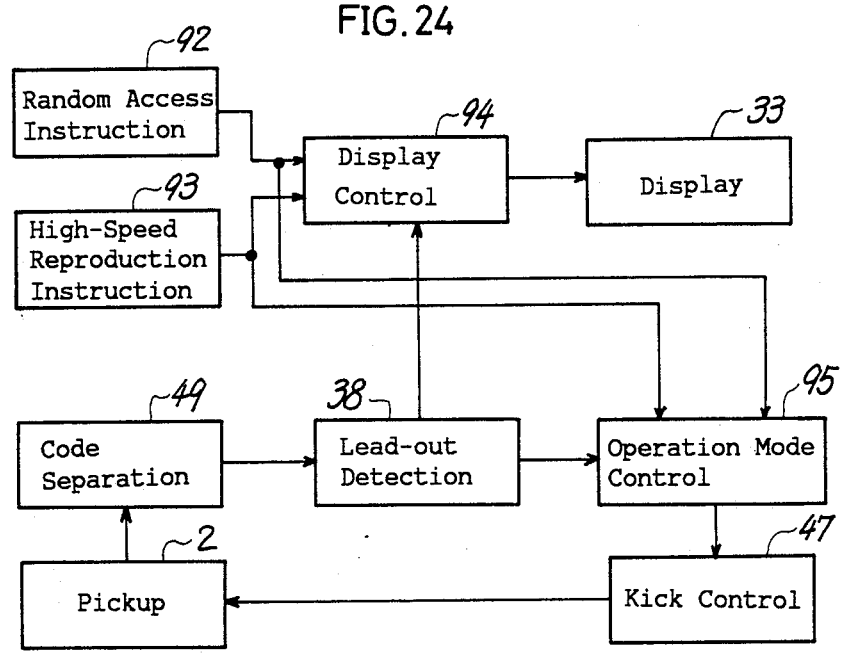
FIG. 24 is a fragmentary block diagram showing another disc player of different construction.

FIG. 24 shows an embodiment adapted to properly move the pickup and properly show representations for random access.

Figure 25:
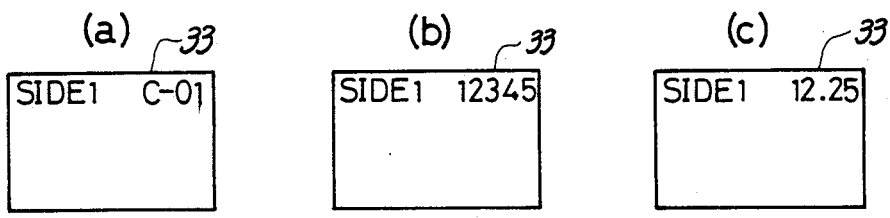
FIGS. 25 (a), (b) and (c) are diagrams showing representations on the display for usual reproduction.

In the usual reproduction mode, the pickup is moved in the same manner as in the disc players already described. FIGS. 25 (a), (b) and (c) show examples of representations on the display. As illustrated, the display 33 shows side data (e.g. "SIDE 1") indicating that the representation side is A side or B side, and a chapter number (e.g. "C-01"), frame number (e.g. "12345") or program time (e.g. 12.25).

The video disc player of FIG. 24 can be set in a high-speed reproduction mode wherein the program area is reproduced while causing the pickup 2 to perform a jumping action by the kick control circuit 47. In this case, the feed motor 18 rotates at a higher speed than in the usual reproduction mode, and the mode of reproduction from the lead-out area slightly differs from the usual reproduction mode. The high-speed reproduction mode is utilized generally for searching for the desired area for reproduction with reference to the display screen. However, if the area desired for reproduction immediately precedes the lead-out area, the pickup will move past the desired area into the lead-out area and read out the lead-out signal. With the disc player adapted for double-side reproduction, the pickup consequently performs a JET TURN movement. This entails the problem of necessitating some time for the pickup to return to the desired reproduction position after performing a JET TURN movement in the opposite direction. The present embodiment therefore has the following expedient.

With reference to FIG. 24, high-speed reproduction instructing means 93 having an operation key delivers a high-speed reproduction instruction to a display control circuit 94 and an operation mode control circuit 95 to set the high-speed reproduction mode, whereupon the lead-out signal detected from the output signal from the pickup 2 via the code separating circuit 49 and the lead-out detecting circuit 38 is fed to the operation mode control circuit 95. This causes the control circuit 95 to set the kick control circuit 47 in a still picture reproduction mode. Consequently, the pickup 2 repeats a track jumping action to remain at the same track position.

Figure 26:
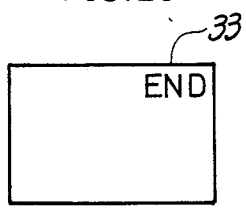
FIG. 26 is a diagram showing a representation on the display when a lead-out signal is detected.
Figure 27:
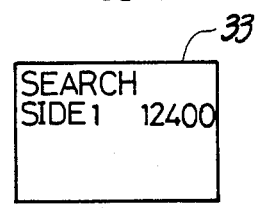
FIG. 27 is a diagram showing a representation on the display during search.

Further the display control circuit 94 shows "END" on the display 33 as shown in FIG. 26 in response to the lead-out signal. FIG. 27 shows a representation on the display 33 in the high-speed reproduction mode. The side data "SIDE 1" and the current address "12400" are on display under the characters of "SEARCH." This representation is changed over to that shown in FIG. 26 upon the detection of the lead-out signal.

The pickup remains in the same track position and "END" is displayed for 5 seconds after the detection of the lead-out signal, followed by high-speed rotation of the feed motor 18 for a JET TURN movement. Accordingly, in the case where the display "END" is given although the desired reproduction area could be found in the high-speed mode, the user may give an instruction for a search operation in a reverse direction to the usual track reproduction direction, i.e. from disc outer periphery toward inner periphery, (hereinafter referred to as "reverse search") before the five-second period elapses, whereby the pickup can be moved to the desired reproduction position before starting the JET TURN movement.

If the pickup performs JET TURN in the absence of the reverse research instruction during the five-second interval, the pickup scans the disc upper side from the innermost peripheral portion thereof as in the usual reproduction mode for high-speed reproduction. Upon the detection of the lead-out signal on the disc upper side, the pickup is retained in a position and "END" is displayed as in reproduction from the lower side. When five seconds has elapsed thereafter without any reverse search, the pickup shifts to the innermost peripheral portion on the disc lower side, i.e. the initial stand-by position, and is held at a stop.

Next, the movement of the pickup and the representation on the display in the random access mode will be described.

A random access instruction is given to the display control circuit 94 and the operation mode control circuit 95 to set the player in the random access mode, by manipulating random access instructing means 92 comprising a random access start key, etc. after the address to be accessed has been set by number entry keys.

The address to be accessed includes one of a chapter number, frame number and program time, and side data as to A side or B side. According to the side data, the pickup 2 scans the disc upper or lower side from the innermost peripheral portion toward the outer periphery. At this time, the pickup scans first at the highest velocity (e.g. 300 times the usual speed, to be referred to as 300-fold velocity or "fast X300"; velocities will hereinafter be expressed similarly). As the pickup approaches the address to be accessed, the reproduction velocity is decreased from 300-fold velocity to 100-fold velocity, to 16-fold velocity, to 3-fold velocity and to the usual velocity. Upon finding the designated address, the pickup reproduces the contemplated chapter in the usual manner.

Figure 28:
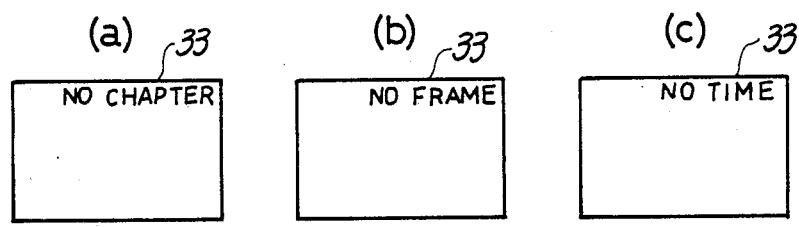
FIGS. 28 (a), (b) and (c) are diagrams showing representations on the display when the designated address has not been found for random access.

If the pickup fails to locate the designated address in the random access mode, for example when the chapter "05" on A side is designated although A side has recorded thereon the data for the chapters "01" to "04", the following operation is carried out. When the pickup 2 reads out the lead-out signal on reaching the lead-out area of A side, the operation mode control circuit 95 sets the kick control circuit 47 in a still picture reproduction mode to hold the pickup 2 on the same track. Upon the detection of the lead-out signal, the display control circuit 94 shows on the display 33 the characters of "NO CHAPTER" indicating that the designated chapter number was not locatable, "NO FRAME" indicating that the designated frame number was not locatable or "NO TIME" meaning that the designated program time was not found, according to the kind of address data (see FIGS. 2B (a), (b) and (c)). The pickup is retained in the same position and the representation on the display is maintained until the user follows another address designating procedure by depressing number entry keys or until the random access mode is cancelled. Thus the display of FIG. 28 (a), (b) or (c) enables the user to recognize that the designated address is not present.

In the random access mode, the pickup 2 reads out the lead-out signal at any reproduction velocity of 1 to 300 times the usual velocity, whereas the lead-out detecting circuit 38 is so adapted as to detect the lead-out signal read out only at the usual reproduction velocity as the regular lead-out signal for the following reason.

Figure 29:
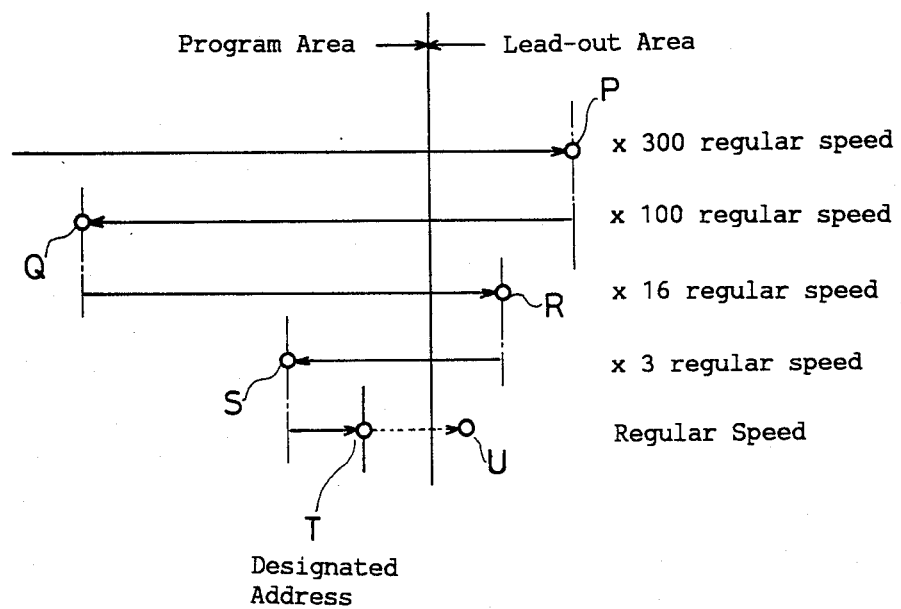
FIG. 29 is a diagram illustrating a search operation.

With reference to FIG. 29, when an address T is designated which immediately precedes the lead-out area on the signal recording face of the disc, the pickup reciprocatingly travels from the program area to the lead out area and vice versa at decreasing velocities of 300-fold, 100-fold, 16-fold, 3-fold and usual velocity and finally reaches the location of the designated address T via points P, Q, R and S. If the lead-out signal is detected during this high-velocity search process at 300-fold, 100-fold, 16-fold and 3-fold velocities, the pickup will stop at point P upon advancing into the lead-out area during the search, whereupon "END" shown in FIG. 26 will be displayed, hence objection. Accordingly, the circuit 38 is adapted to detect the lead-out signal only during reproduction at the usual velocity, permitting the pickup to reach the designated address.

In the case where point T in FIG. 29 is not the designated address, and the designated address is not present on the reproduction side, the pickup advances into the lead-out area at the usual velocity as indicated in a broken line in FIG. 29. In this case, the display screen is made mute, and the lead-out signal is detected at point U, whereupon the pickup is retained in the same position, and the above-mentioned display given as already described.

The access operation involving varying reproduction velocities is executed not only for scanning across the program area and the lead-out area but also for scanning the program area. For example when the frame number "1000" is designated, the pickup is brought to frame "1300" at 300-fold velocity, then to frame "900" at 100-fold velocity, to frame "1050" at 16-fold velocity and to frame "995" at 3-fold velocity and finally reaches the designated frame "1000" at the usual velocity.

Figure 30:
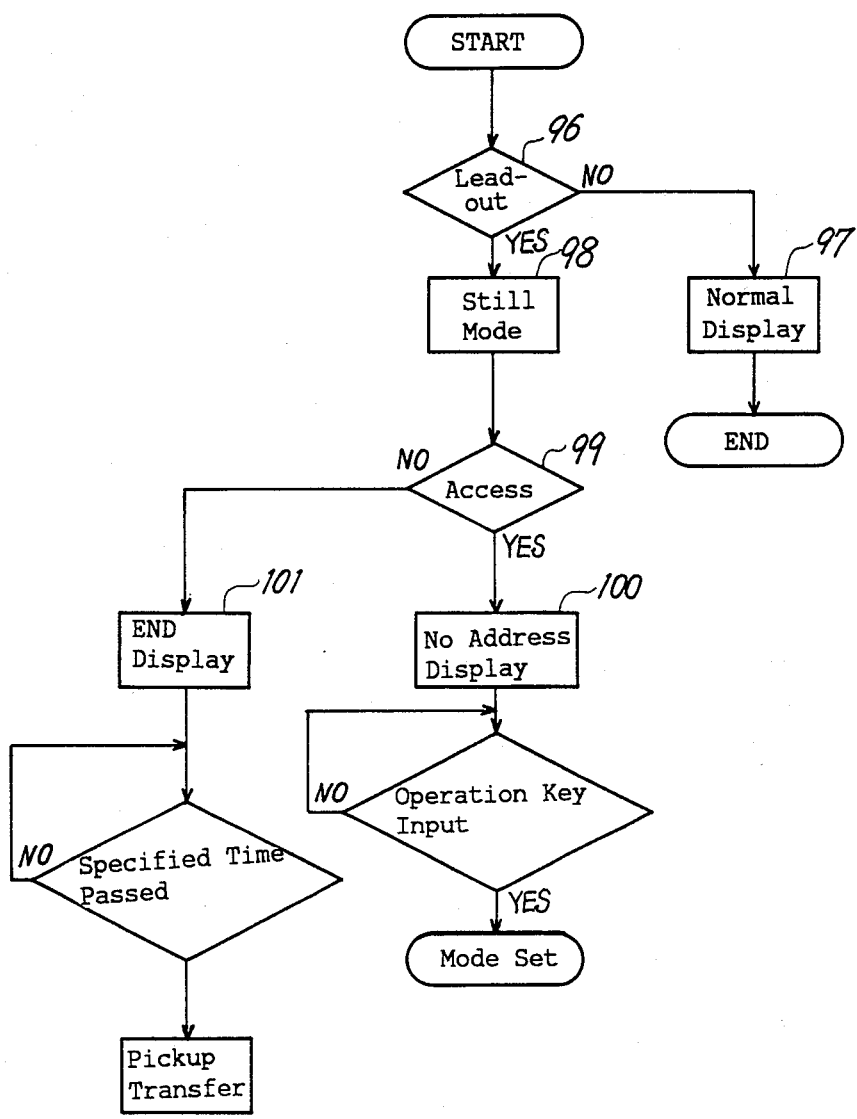
FIG. 30 is a flow chart showing the operation of the player of FIG. 24.

FIG. 30 shows the operation of the operation mode control circuit 95.

First, step 96 inquires whether the lead-out signal has been detected. If the answer is in the negative, a usual display as shown in FIG. 27 is given in step 97. When the answer is in the affirmative, the still picture reproduction mode is set in step 98. The following step 99 inquires whether a random access instruction is given. When the instruction is given, the display shows "NO ADDRESS" representation such as one shown in FIG. 28 (step 100). The system then waits for the input from an operation key specifying the next operation mode. In response to the key input given, the corresponding mode is set. On the other hand, if no random access instruction is delivered, "END" is displayed as shown in FIG. 26. A predetermined period of time thereafter, the pickup is shifted to the standby position.

If the address to be accessed is designated erroneously in the random access mode, the circuit of FIG. 24 functions to immediately display the absence of the address in error and is therefore of great use.

What is claimed is:

1. An apparatus for reproducing signals from both sides of a disc in succession having at least one pickup movable radially of the disc while the disc is being rotated at a high speed, drive control means for controlling the rotation of the disc and the movement of the pickup, and signal reproduction means having connected thereto the output terminal of the pickup, the apparatus being characterized in that the apparatus comprises means for detecting that the signal reproduction side of the disc opposed to the pickup is being changed over from one side to the other side, and means for notifying the user that the reproduction side is being changed over according to an output signal from the detecting means.

2. An apparatus as defined in claim 1 wherein the disc is an optical disc, and the pickup is an optical pickup for optically reading out the signals from the optical disc, the pickup being coupled to a pickup transport assembly provided with U-shaped guide means, the guide means comprising a pair of straight portions for moving the pickup therealong and along the signal recording face of the disc radially thereof, and a circular-arc connecting portion interconnecting the straight portions, the pickup being movable from one side of the disc to the other side thereof while being inverted by moving along the connecting portion.

3. An apparatus as defined in claim 1 wherein the notifying means has connected thereto a display serving as an external video device and is provided with a control circuit for showing in the form of an image what is to be notified.

4. An apparatus as defined in claim 3 wherein the control circuit shows the direction of movement of the pickup on the screen of the display.

5. An apparatus as defined in claim 1 wherein the notifying means is provided with a circuit for synthesizing what is to be notified as a voice, and a loudspeaker having connected thereto the output terminal of the synthesizing circuit.

6. An apparatus as defined in claim 2 wherein the disc reproduction side change-over detecting means has means for detecting a lead-out signal from the side of the disc which is subjected to signal reproduction first in a double-side successive reproduction mode, and interprets the detection of the lead-out signal as indicating the start of the reproduction side change-over 7. An apparatus as defined in claim 2 wherein the disc reproduction side change-over detecting means has means for detecting a pickup inversion instruction given to the pickup transport assembly, and interprets the detection of the instruction as indicating the start of the reproduction side change-over.

8. An apparatus as defined in claim 2 wherein the disc reproduction side change-over detecting means has means for detecting that the pickup has moved out of the lead-in area on the side of the disc to be subjected to signal reproduction after the other side thereof, and interprets the detection of the moving-out of the pickup as indicating the completion of reproduction side change-over.

9. An apparatus as defined in claim 2 wherein the disc reproduction side change-over detecting means has means for measuring a predetermined period of time after a lead-out signal has been detected from the side of the disc to be subjected to signal reproduction, and interprets the lapse of the predetermined time period as indicating the completion of the reproduction side change-over.

10. An apparatus as defined in claim 3 wherein the disc reproduction side change-over detecting means has means for computing the position of the pickup from the amount of rotation of a feed motor for transporting the pickup radially of the disc, and the position of the pickup detected by the computing means is shown on the screen of the display.

11. An apparatus as defined in claim 4 wherein the disc reproduction side change-over detecting means has side data detecting means for reading out side data from the signal recording face of the disc, and means for judging the orientation of the disc from the side data obtained by the side data detecting means, and when reproduction from the side specific to the disc is to be followed by reproduction from the other side thereof irrespective of the orientation of the disc, the control circuit controls the display based on the result obtained by the judging means so that the display shows a definite direction of movement at all times.

12. An apparatus for reproducing signals from both sides of a disc in succession having at least one pickup movable radially of the disc while the disc is being rotated at a high speed, drive control means for controlling the rotation of the disc and the movement of the pickup, and signal reproduction means having connected thereto the output terminal of the pickup, the apparatus being characterized in that the apparatus comprises side data detecting means for reading out side data from the signal recording face of the disc, means for detecting the side of the disc opposed to the pickup, and display means for showing the side data when the side data is recorded on the disc and for showing the content of an output from the side detecting means when no side data is recorded on the disc.

13. An apparatus for reproducing signals from both sides of a disc in succession having at least one pickup movable radially of the disc while the disc is being rotated at a high speed, drive control means for controlling the rotation of the disc and the movement of the pickup, and signal reproduction means having connected thereto the output terminal of the pickup, the apparatus being characterized in that the apparatus comprises address designating means for designating the address where reproduction by the pickup is to be started and side data, and access control means for controlling random access to both sides of the disc based on the side data designated by the address designating means.

14. An apparatus for reproducing signals from both sides of a disc in succession having at least one pickup movable radially of the disc while the disc is being rotated at a high speed, drive control means for controlling the rotation of the disc and the movement of the pickup, and signal reproduction means having connected thereto the output terminal of the pickup, the apparatus being characterized in that the apparatus comprises random access means for shifting the pickup to a desired address position, lead-out detecting means for reading out a lead-out signal from the signal recording face of the disc, and display means for indicating that no designated address is found when the lead-out signal has been detected by the lead-out detecting means in a random access mode.

* * * * *

UNITED STATES PATENT AND TRADEMARK OFFICE
CERTIFICATE OF CORRECTION

PATENT NO. : 4,903,140
DATED : February 20, 1990
INVENTOR(S) : OKAMOTO et al

It is certified that error appears in the above-identified patent and that said Letters Patent is hereby corrected as shown below:

On the cover page, Item [75], "Nasashi Yagi" should read --Masashi Yagi--.

Signed and Sealed this

Nineteenth Day of March, 1991

*Attest:*

HARRY F. MANBECK, JR.

*Attesting Officer*      *Commissioner of Patents and Trademarks*